(12) United States Patent
Pompa et al.

(10) Patent No.: US 11,885,359 B2
(45) Date of Patent: Jan. 30, 2024

(54) SYSTEMS FOR SECURING FLORA OR FAUNA FRAGMENTS TO AN UNDERWATER SUBSTRATE AND METHODS RELATED THERETO

(71) Applicant: Reefgen, Inc., San Francisco, CA (US)

(72) Inventors: Jonathan Pompa, Long Beach, CA (US); David Solomon, San Francisco, CA (US); Abhimanyu Belani, San Francisco, CA (US); Liang Yu Chi, San Francisco, CA (US)

(73) Assignee: Reefgen, Inc., San Francisco, CA (US)

( * ) Notice: Subject to any disclaimer, the term of this patent is extended or adjusted under 35 U.S.C. 154(b) by 0 days.

(21) Appl. No.: 17/885,555

(22) Filed: Aug. 11, 2022

(65) Prior Publication Data

US 2023/0051177 A1    Feb. 16, 2023

Related U.S. Application Data

(60) Provisional application No. 63/232,321, filed on Aug. 12, 2021.

(51) Int. Cl.
*F16B 2/22*    (2006.01)
*A01K 61/70*    (2017.01)

(52) U.S. Cl.
CPC ............... *F16B 2/22* (2013.01); *A01K 61/70* (2017.01)

(58) Field of Classification Search
CPC ...... Y10T 24/44026; F16B 21/06; F16B 2/22; F16B 37/043; F16B 21/00; A01K 61/70
See application file for complete search history.

(56) References Cited

U.S. PATENT DOCUMENTS

| | | | | |
|---|---|---|---|---|
| 6,209,175 B1* | 4/2001 | Gershenson | ............ | F16B 5/065 411/509 |
| 6,507,976 B2* | 1/2003 | Ichimaru | ............... | F16B 37/042 248/188.4 |
| 7,055,785 B1* | 6/2006 | Diggle, III | ............... | H02G 3/26 248/74.3 |
| 7,114,217 B2* | 10/2006 | Matsuzawa | ............. | E05F 5/022 16/2.2 |
| 8,635,758 B2* | 1/2014 | Slepecki | ................. | F16B 13/12 40/745 |

\* cited by examiner

*Primary Examiner* — Robert Sandy
(74) *Attorney, Agent, or Firm* — EcoTech Law Group, P.C.

(57) ABSTRACT

A securing clip includes: an enclosure body including a first end, a second end, and one or more sidewalls that extend between the first end and the second end; one or more fragment module securing tangs extending, from one or more of the sidewalls, into the cavity such that when at least a portion of the fragment module is placed within the cavity, at least a portion of the fragment module securing tang is designed to engage with the fragment module and prevents and/or impedes removal of at least a portion of the fragment module from the cavity; and one or more substrate securing tangs extending from the enclosure body and away from the cavity, each substrate securing tang designed to prevent and/or impede removal of the securing clip when the securing clip is placed into a substrate aperture defined within the substrate.

16 Claims, 8 Drawing Sheets

SYSTEMS FOR SECURING FLORA OR FAUNA FRAGMENTS TO AN UNDERWATER SUBSTRATE AND METHODS RELATED THERETO

RELATED APPLICATION

This application claims priority from U.S. Provisional Application having Ser. No. 63/232,321, filed on Aug. 12, 2021, which is incorporated by reference for all purposes.

FIELD

The present teachings generally relate to novel systems and methods for securing flora/fauna fragments (e.g., coral fragments) to an underwater substrate (e.g., a reef, barrier, rock, and seafloor). More particularly, the present teachings relate to inexpensive and easy-to-operate systems and methods for securing a flora/fauna fragment to underwater substrates using securing clips.

BACKGROUND

Coral habitats (e.g., coral reefs) are rapidly disappearing due to, for example, pollutants, changes in climate, increasing water temperature, and changes in water composition. Regenerating or regrowing coral habitats, by planting new coral flora and/or fauna fragments, however, is slow, difficult, and expensive.

What is needed, therefore, are systems and methods to regenerate or regrow coral habitats in a quick, easy, and cost-effective manner.

SUMMARY

To this end, the present arrangements and teachings provide improved systems for securing flora and/or fauna fragments to an underwater substrate and methods related thereto. In one aspect, the present arrangements provide a securing clip including an enclosure body, one or more fragment module securing tangs (hereinafter referred to as a "fragment securing tang"), and one or more substrate securing tangs. The enclosure body includes a first end, a second end, and one or more sidewalls that extend between the first end and the second end. One or more of the sidewalls are designed to at least partially surround at least a portion of a fragment module when the fragment module is disposed within a cavity defined between one or more of the sidewalls.

One or more of the fragment securing tangs extend from one or more of the sidewalls into the cavity. In this configuration, when at least a portion of the fragment module is placed within the cavity, at least a portion of the fragment module securing tang is designed to engage with the fragment module and prevent and/or impede removal of at least a portion of the fragment module from the cavity.

One or more substrate securing tangs extends from the enclosure body and away from the cavity. In this configuration, each of the substrate securing tangs is designed to prevent and/or impede removal of the enclosure body positioned inside a substrate aperture defined within a substrate.

In one embodiment of the present arrangements, at least one edge or surface of one or more of the fragment securing tangs engages with the fragment module to prevent and/or impede removal of at least a portion of the fragment module from the cavity.

The enclosure body, in one embodiment of the present arrangements includes six sidewalls and the cavity defined by the sidewalls is hexagonal. In another embodiment of the present arrangements, the enclosure body includes a circular sidewall.

One or more of the sidewalls, in one embodiment of the present arrangements, is pliable such that, when at least a portion of the fragment module is placed in the cavity, a force is applied to one or more of the sidewalls bends one or more of the sidewalls such that one or more of the fragment module securing tangs contacts the fragment module.

The cavity, in one embodiment of the present arrangements, extends through the first end and the second end such that, when the fragment module is placed into the cavity, at least a portion of the fragment module extends beyond the first end and/or the second end.

The securing clip, in one embodiment of the present arrangements, is produced from a single piece of material. The securing clip may be made from a material that corrodes when the material is exposed to saltwater and is selected from at least one material selected from a group including biodegradable plastic, steel, aluminum, plants, plastic, and fungi.

The securing clip, in one embodiment of the present arrangements, further includes one or more tabs extending from the first end and away from the cavity. When the fragment module is placed in the securing clip, each of the tangs is designed to contact a disc portion of the fragment module. One or more of the tabs, in another embodiment of the present arrangements, extends perpendicular to one or more of the sidewalls.

In yet another embodiment of the present arrangements, one or more of the substrate securing tangs extends from a base portion of the enclosure body. The base portion extends from the second end of the enclosure body.

The securing clip of claim 1, wherein one or more of the substrate securing tangs extends from one or more of the sidewalls.

In another aspect, the present teachings also provide a process for securing a fragment module to a substrate. In one implementation of the present teachings, the method includes: (i) obtaining a fragment module of flora or fauna; (ii) obtaining a securing clip including: an enclosure body having one or more sidewalls and a cavity defined between one or more of the sidewalls; one or more fragment securing tangs extending into the cavity; and one or more substrate securing tangs extending from the enclosure body and away from the cavity; (iii) receiving, within the cavity, at least a portion of the fragment module; (iv) engaging the fragment module with one or more of the fragment securing tangs to prevent and/or impede removal of at least a portion of the fragment module from securing clip; (v) positioning the securing clip into a substrate aperture defined within the substrate; and (vi) engaging, using one or more of the substrate securing tangs, the securing clip with a substrate aperture sidewall to prevent and/or impede removal of the securing clip from the substrate aperture.

In one embodiment of the present teachings, engaging the fragment module further includes deflecting one or more of the fragment securing tangs towards one or more of the sidewalls when at least a portion of the fragment module is placed within the cavity and generating a spring force away from one or more of the sidewalls to prevent and/or impede removal of at least a portion of the fragment module from the cavity.

In another embodiment of the present teachings, engaging the securing clip further includes deflecting one or more of the substrate securing tangs towards the enclosure body when at least a portion of the securing clip is placed into the substrate aperture and generating a spring force away from the enclosure body to prevent and/or impede removal of the securing clip.

The construction and method of operation of the invention, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

Coral habitats provide critical ecosystems and environments for thousands of aquatic and land-based organisms. Coral habitats, which can be found worldwide, occupy only about 2% of the seafloor but about 25% of all marine life live within this small zone. In addition to the unique biodiversity of the coral habitats, they protect coastlines by absorbing wave energy, thus preventing erosion, and reducing damage caused by storms, hurricanes, and cyclones. Moreover, these habitats provide a vital food and economic resource to humans around the world. Coral habitats are rapidly disappearing and a need exists to regenerate these critically important habitats.

To this end, the present arrangements and teachings provide novel systems and methods of regenerating or replanting a coral habitat. Specifically, the present arrangements and teachings allow a user to quickly and easily secure flora or fauna fragment modules ("fragment modules") to an underwater substrate. The fragment module may be a biological fragment (i.e., a piece of living coral) or a structure onto which coral is grown. By way of example, coral may be grown on the surface of a ceramic plug.

To secure the fragment module to a substrate, the present teachings and arrangements use a novel securing clip. The fragment module is secured within the securing clip. Moreover, the securing clip is secured to a substrate such that the coral, from the fragment module, is adjacent to and can grow onto the substrate. As the coral grows, the coral will expand beyond the securing clip and onto the substrate—forming a coral habitat, such as a coral reef.

Figure 1:
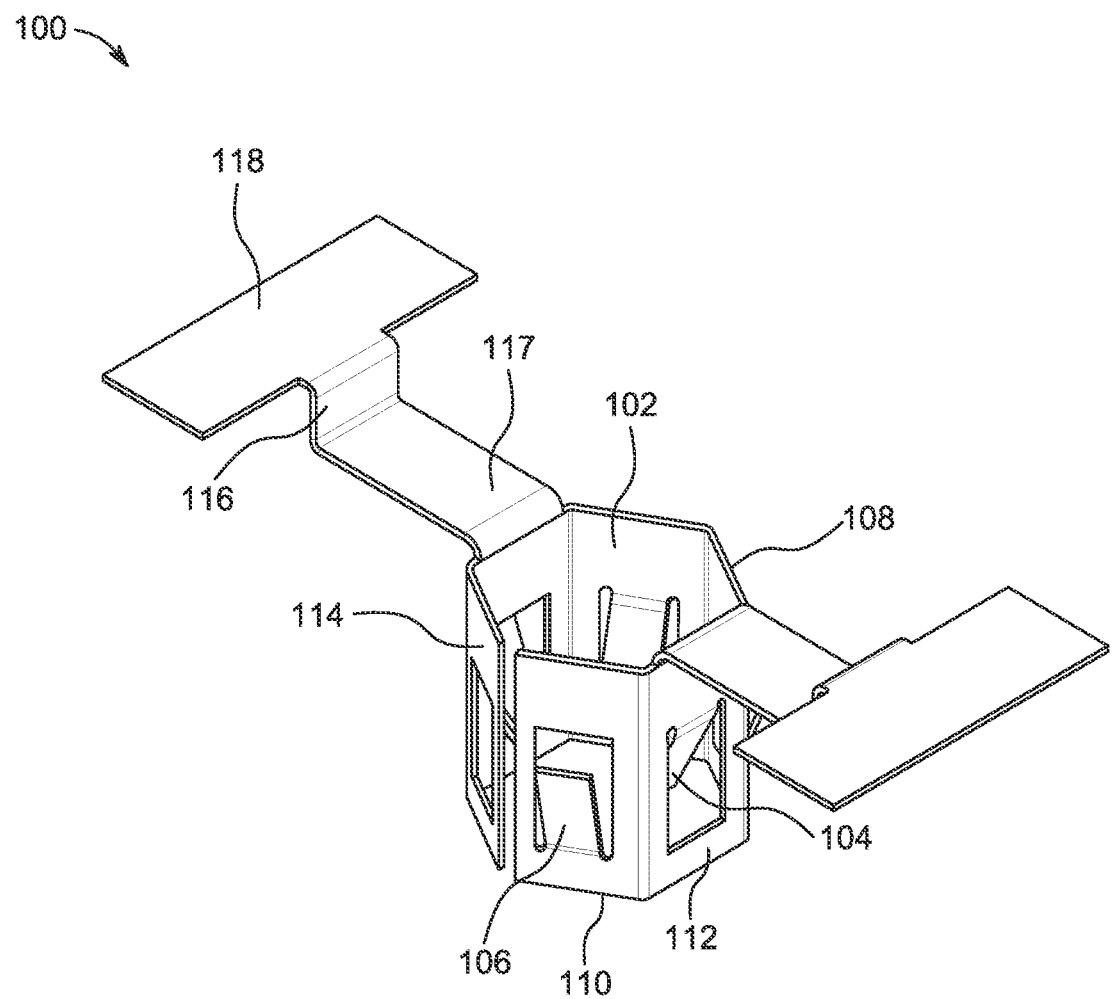
FIG. 1 shows a perspective view of a securing clip, according to one embodiment of the present arrangements, and that includes one or more fragment module securing tangs designed to engage with a fragment module and one or more substrate securing tangs designed to engage with a substrate.

By way of example, FIG. 1 shows a securing clip 100, according to one embodiment of the present arrangements, that includes an enclosure body 102, one or more fragment module securing tangs (hereinafter referred to as "fragment securing tangs") 104, and one or more substrate securing tangs 106. Enclosure body 102 includes a first end 108, a second end 110, and one or more sidewalls 112 that extend between first end 108 and second end 110. One or more sidewalls 112 define a cavity, extending from first end 108 to second 110, within enclosure body 102. When a fragment module (e.g., fragment module 220 of FIG. 2) is disposed within the cavity, one or more sidewalls 11 at least partially surround a portion of the fragment module.

One or more fragment securing tangs 104 extend, from one or more sidewalls 112, into the cavity. In a preferred embodiment of the present arrangements, at least a portion of each fragment 104 securing tang extends into the cavity towards second end 110, and away from first end 108. As will be discussed in greater detail below concerning FIG. 3, when a portion of a fragment module is placed within the cavity defined by one or more sidewalls 112, a portion of fragment securing tang 104 contacts the fragment module to prevent and/or impede vertical movement in one direction or removal of the fragment module from the fragment cavity.

One or more substrate securing tangs 106 extend from enclosure body 102 (e.g., an exterior surface 114 of one or more sidewalls 112) and away from the cavity. In a preferred embodiment of the present arrangements, at least a portion of each substrate securing tang 106 extends from enclosure body 102 towards first end 108, and away from second end 110. As will be discussed in greater detail below concerning FIG. 3, when securing clip 100 is disposed within a substrate aperture (e.g., substrate aperture 224 of FIG. 2), a portion of substrate securing tangs 106 contacts a substrate aperture sidewall (e.g., substrate aperture sidewalls 323 of FIG. 2) to prevent and/or impede vertical movement in one direction or removal securing clip 100 from the substrate aperture.

Securing clip 100 further includes one or more tabs 116 that extend from first end 108 and/or one or more of sidewalls 112. As will be explained in greater detail below, when the fragment module is placed in securing clip 100, one or more supporting portions 117 of one or more tabs 116 are designed to contact a disc or circular portion of the fragment module. One or more supporting portions 117 may be perpendicular to one or more sidewalls 112 and/or have a surface profile that is substantially similar to a surface profile of the fragment module that will contact one or more supporting portions. Thus, in an assembled configuration, when the fragment module is disposed within securing clip 100, one or more supporting portions 117 of to contact a disc or circular portion of the fragment module.

In one embodiment of the present arrangements, each tab 116 further includes a raised portion 118 that is substantially parallel and elevated from supporting portion 117. The raised portion of tab 116 may be used to grasp and/or handle securing clip 100 during use. By way of example, a lifting mechanism may interact with a top surface, a bottom surface, or both surfaces of raised portion 118 to move securing clip 100.

In one embodiment of the present arrangements, raised portion 118 is elevated from supporting portion 117 by a distance value that ranges between about 0.125 inches to about 1 inch. In a preferred embodiment of the present arrangements, raised portion 118 is elevated from supporting portion 117 by a distance value that ranges between about 0.1875 inches to about 0.75 inches. In a more preferred embodiment of the present arrangements, raised portion 118 is elevated from supporting portion 117 by a distance value that ranges between about 0.25 inches to about 0.5 inches.

In an assembled configuration of securing clip 100, when the fragment module is disposed within the securing clip, raised portion 118 is elevated above a top surface of the fragment module. In this embodiment, a lifting mechanism may interact with raised portion 118 without contacting the fragment module, components used during transportation, and/or substrate (e.g., substrate 22 of FIG. 2).

The present teachings recognize that securing clip 100 may include any number of sidewalls 112. In one embodiment of the present arrangements, securing clip 100 includes six sidewalls 112 to form a hexagonal-shaped cavity. In this configuration, securing clip 100 includes three fragment securing tangs 104, each of which extends from an individual sidewall 112. Moreover, three substrate securing tangs 106 extend from each of the remaining sidewalls 112. Preferably, each fragment securing tang 104 and substrate securing tang 106 are located on alternating sidewalls 112 around enclosure body 102.

The present arrangements and teachings also recognize that securing clip 102 may be made from any material. Preferably, however, securing clip 100 is made from a material that releases minimal pollutants and dissolves or corrodes when exposed to seawater. To this end, securing clip 102 may be made from at least one material selected from a group comprising steel, wood, biodegradable plastic, composites of carbon, glass, or mineral fibers in a resin matrix, aluminum, plants, fungi, and nonferrous metals such as titanium, magnesium alloys, and brass. In another embodiment of the present arrangements, securing clip 100 is magnetic.

In a preferred embodiment of the present arrangements, securing clip 100 is manufactured from a single piece of material. By way of example, securing clip 100 is stamped from a sheet of material, and then bent to the shape shown in FIG. 1. The present arrangement and teachings recognize that securing clip 100 may be assembled from multiple components and that the components may or may not be made from the same material. Additionally, securing clip 102 may be formed using 3D printing, injection molding, casting, stamping, forming, forging, roto molding, machining, and/or laser cutting.

Figure 2:
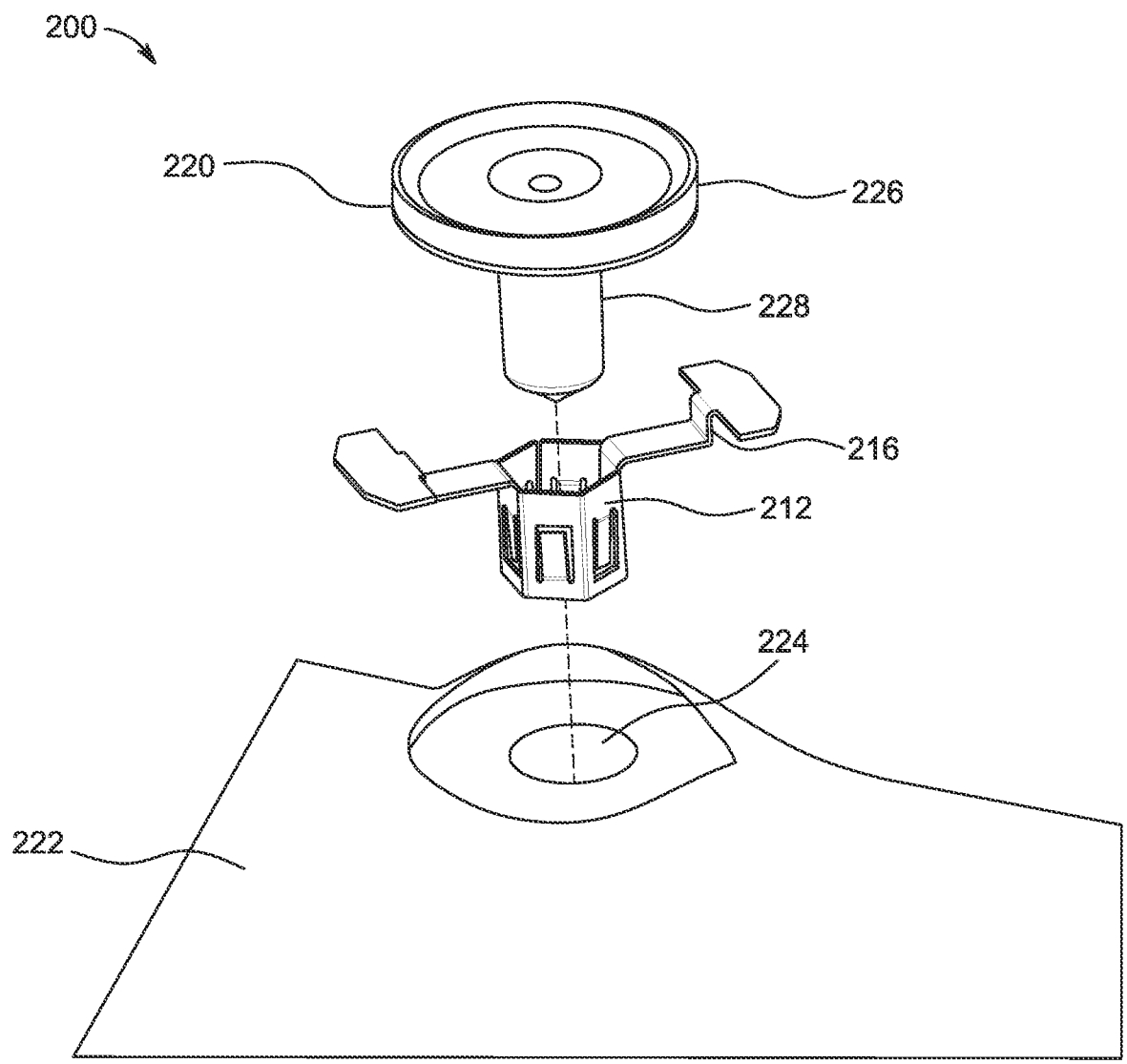
FIG. 2 shows an exploded view of the securing clip of FIG. 1, fragment module, and a substrate.

FIG. 2 shows a securing clip 200, according to one embodiment of the present arrangements, with a fragment module 220, and a substrate 222 in an unassembled configuration. Securing clip 200 is substantially similar to securing clip 100 of FIG. 1. A stem portion 228 of fragment module 220 may be received into a cavity formed by one or more sidewalls 212 of securing clip 200. A disc or circular portion 226 of fragment module 220, as described above, may nest within one or more tabs 216. Securing clip 200 may be positioned within a substrate aperture 224 of substrate 222. While FIG. 2 shows that substrate aperture 224 is circular, the present arrangements are not limited. The sidewalls that define substrate aperture 224 may be of any shape (e.g., hexagon, square, triangle, and oval).

Figure 3:
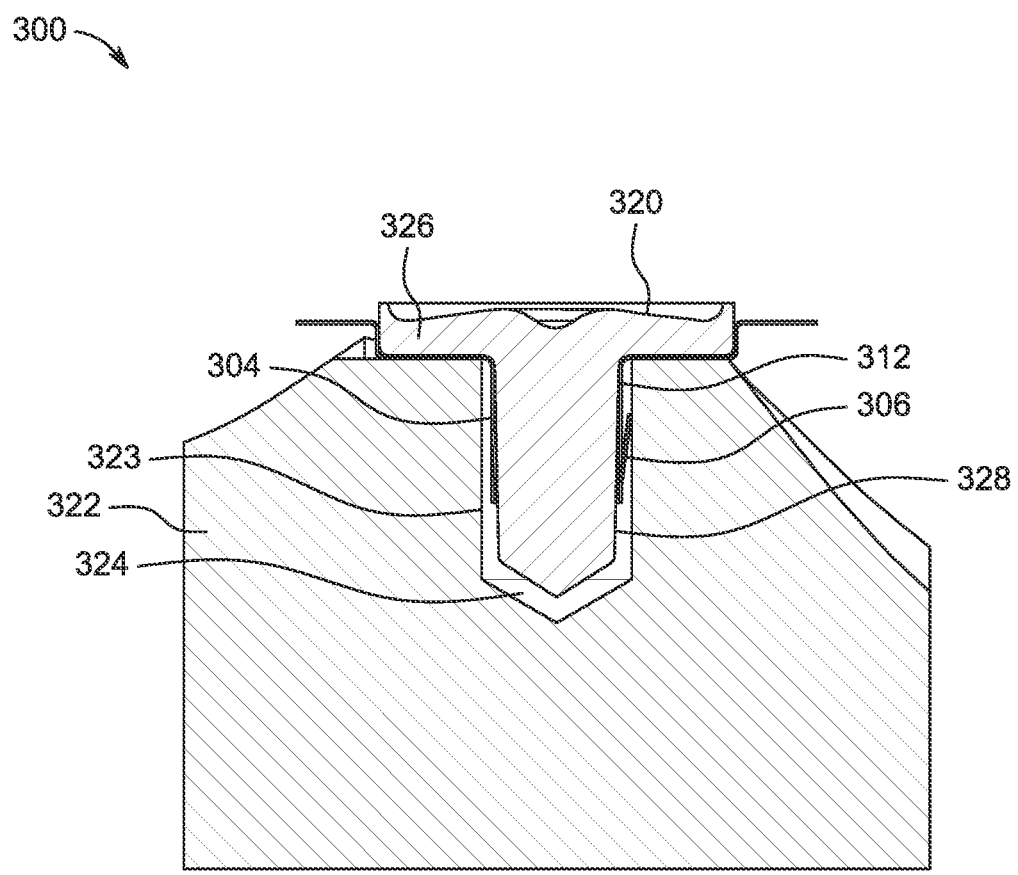
FIG. 3 shows a cross-sectional view of the securing clip, fragment module, and substrate of FIG. 2, wherein the securing clip is disposed within the substrate and the fragment module is secured within the securing clip.

FIG. 3 shows a securing clip 300, according to one embodiment of the present arrangements, in an assembled configuration. A portion of fragment module 320 is secured within securing clip 300 and securing clip 300 is disposed within and secured to a substrate aperture 324. Securing clip 300, fragment module 320, and substrate aperture 324 are substantially similar to their counterparts in FIG. 2 (i.e., securing clip 200, fragment module 220, and substrate aperture 224, respectively).

As discussed above, one or more fragment securing tangs 304 extend into a cavity defined by one or more sidewalls 312. In this assembled configuration, a portion of fragment securing tang 304 contacts a stem portion 328 of fragment module 320 and deflects one or more fragment securing tangs 304 towards one or more sidewalls 312. One or more fragment securing tangs 304, in a deflected state, generate a spring towards fragment module 320, and away from one or more sidewalls 312. The spring force of one or more fragment securing tangs 304, against fragment module 320, prevents and/or impedes vertical movement in one vertical direction or removal of at least a portion of fragment module 320 from the cavity. In other words, fragment module 320 may be pushed, in one vertical direction, into the cavity, but one more fragment securing tangs prevent or impede fragment module 320 from being pulled out of the cavity, in another opposing vertical direction.

In one embodiment of the present arrangements, at least an edge or surface of each of one or more fragment securing tangs 104 engages with the fragment module to prevent and/or impede vertical movement or removal of the fragment module from the fragment cavity.

One or more substrate securing tangs 306, extending from securing clip 300, contacts a substrate aperture sidewall 323 and deflects one or more substrate securing tangs 106 towards securing clip 300. One or more substrate securing tangs 306, in a deflected state, generate a spring force towards substrate aperture sidewall 323, and away from securing clip 300. The spring force of one or more substrate securing tangs 606 prevents and/or impedes the movement of the fragment module 320 in one vertical direction, and/or removal of at least a portion of the fragment module from substrate aperture 324. In other words, securing clip 300 may be pushed, in the one vertical direction, into substrate aperture 324, but one more substrate securing tangs 306 prevent or impede securing clip 300 from being pulled out of substrate aperture 324.

As shown in FIG. 3, a disc or circular portion 326, of fragment module 320, is in close proximity to a surface of substrate 322, and stem portion 328, of fragment module 320, is adjacent to substrate aperture sidewall 323. As the coral on fragment module 320 matures, new coral growth attaches to substrate 322 and substrate aperture sidewalls 323. Moreover, if securing clip 300 is soluble or corrosive in salt water, it dissolves or corrodes and is replaced by new coral growth. Thus, a new colony of coral is formed on substrate 322.

Figure 4A:
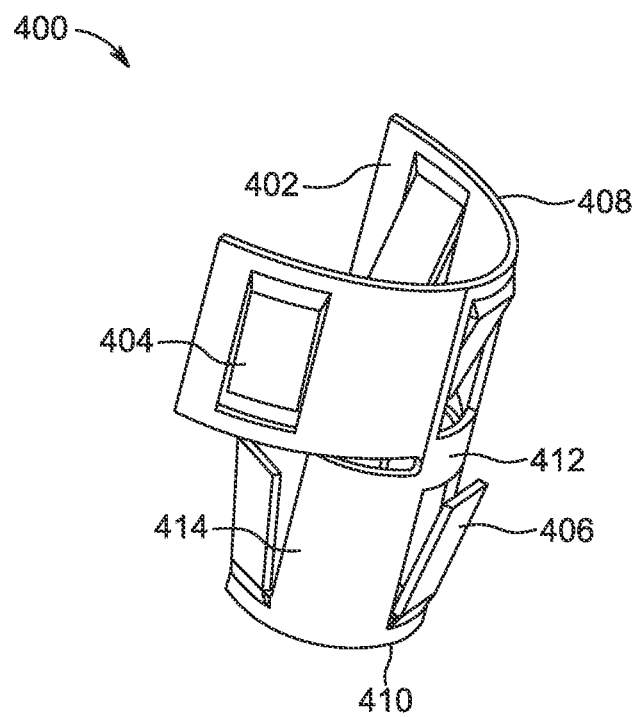
FIG. 4A shows a perspective view of a securing clip, according to yet another embodiment of the present arrangements, having sidewalls that are capable of opening and closing around the fragment module or coral and the sidewalls are in an open position—i.e., open to receive a fragment module or piece of coral.
Figure 4B:
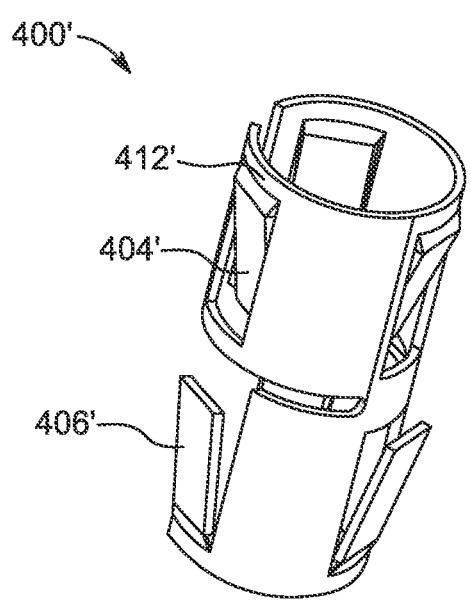
FIG. 4B shows a perspective view of the securing clip of FIG. 4A, wherein the sidewalls are in a closed position—i.e., closed around the fragment module or piece of coral to secure the fragment module to the securing clip.

The present teachings and arrangements recognize that a fragment module or piece of coral may have an irregular shape or may not fit within the cavity defined by one or more securing clip sidewalls. The present arrangements provide securing clips that can secure fragment modules or pieces of coral by including sidewalls that are capable of opening and closing around the fragment module or coral. By way of example, FIGS. 4A and 4B show a securing clip 400 and 400', respectively, according to one embodiment of the present arrangements. FIG. 4A shows securing clip 400 in an open position—i.e., open to receive a fragment module or piece of coral, and FIG. 4B shows securing clip 400' in a closed position—i.e., closed after a fragment module or piece of coral has been placed in securing clip 400'.

As shown in FIG. 4A, securing clip 400 includes an enclosure body 402 having a circular sidewall 412 does not extend around the circumference of enclosure body 402. At least a portion of securing clip 400 has a sidewall gap or opening along the circumference of circular sidewall 412. This sidewall gap or opening allows a fragment module or piece of coral to be placed within the cavity defined by circular sidewall 412. Moreover, the sidewall gap or opening of circular sidewall 412 may be adjusted to increase or decrease the gap opening.

Enclosure body 402 includes one or more fragment securing tangs 404 that extend into a cavity defined by a circular sidewall 412. In one embodiment of the present arrangements, one or more fragment securing tangs 404 are positioned along a circumference or perimeter of circular sidewall 412 proximate to first end 408. Preferably, one or more fragment securing tangs 404 are located on at least a portion of circular sidewall 412 that also includes the sidewall gap or opening.

Moreover, enclosure body includes one or more substrate securing tangs 406 that extend from an exterior surface 414 of circular sidewall 412. One or more substrate securing tangs 406, in one implementation of the present arrangements, are positioned along or around a circumference or perimeter of circular sidewall 412 proximate to second end 410.

FIG. 4B, show securing clip 400' having a reduced sidewall gap or deduced opening along a circumference of circular sidewall 412'. In other words, the sidewall gap or opening has decreased compared to the sidewall gap in FIG. 4A. Circular sidewall 412 may be adjusted into a closed position until one or more fragment securing tangs 404' engages with a fragment module or piece of coral to prevent vertical displacement or removal of fragment module or piece of coral from securing clip 400'. One or more substrate securing tangs 406' engage with an inner sidewall of a substrate aperture (e.g., substrate aperture 324 of FIG. 3) to prevent vertical displacement or removal of securing clip 400' from the substrate aperture.

Figure 5:
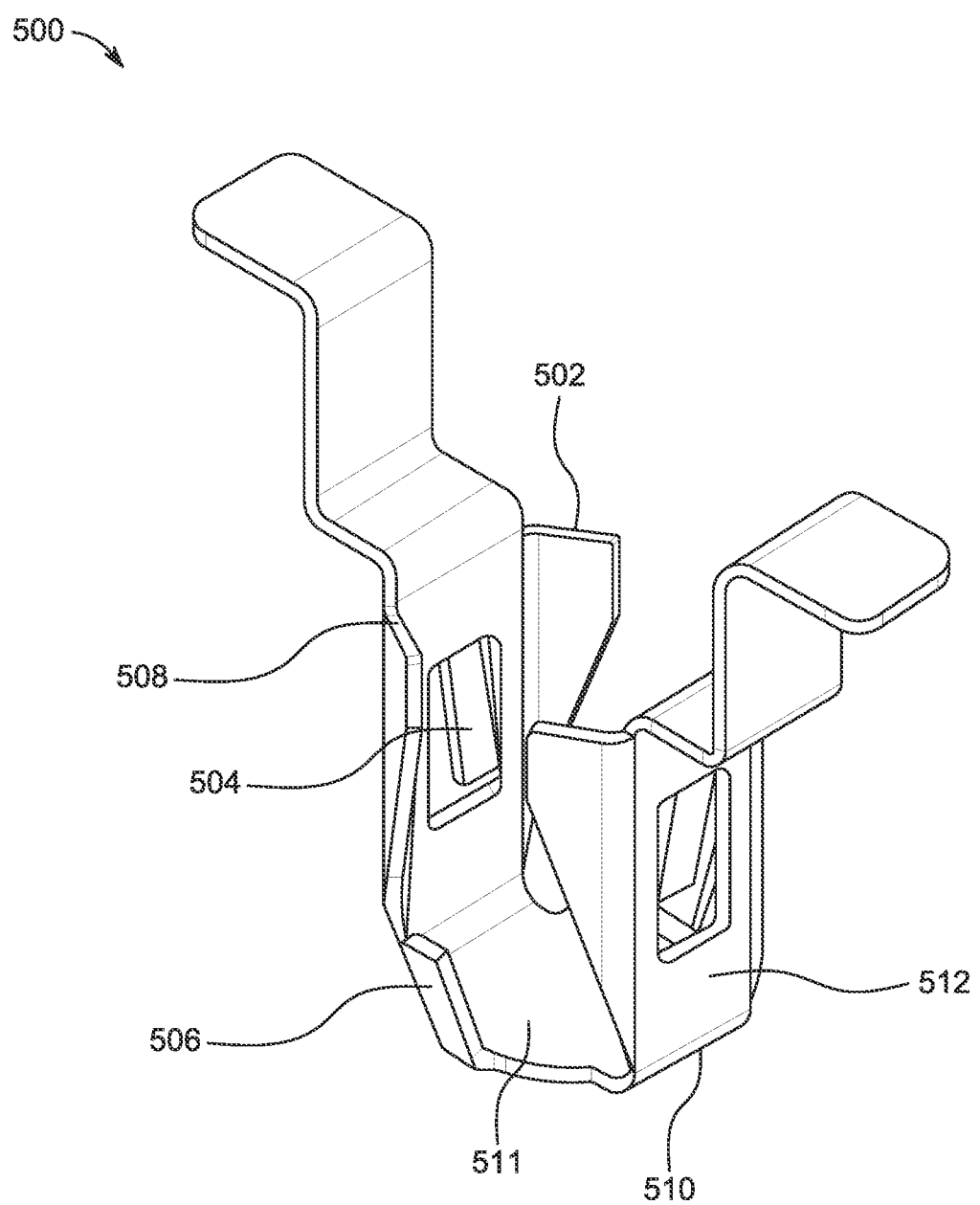
FIG. 5 shows a perspective view of a securing clip, according to yet another embodiment of the present arrangements, wherein one or more substrate securing tangs extend from a base portion of the securing clip.

FIG. 5 shows a securing clip 500, according to yet another embodiment of the present arrangements, wherein one or more substrate securing tangs 506 extend from a base portion 511 of an enclosure body 502. Enclosure body 502 includes a first end 508 and base portion 511 located at a second end 510. One or more sidewalls 512 extends between first end base portion 511 and define a cavity that extends, through first end 508, to base portion 511.

In this embodiment, as securing clip 500 is pushed into a substrate aperture (e.g., substrate aperture 324 of FIG. 3), one or more substrate securing tangs 506 contact and engages with substrate aperture sidewalls (e.g., substrate aperture sidewalls 323 of FIG. 3) after base portion 511 enters the substrate aperture. Moreover, in an installed state, one or more substrate securing tangs 506 are located towards the bottom portion of the substrate aperture. Thus, if a surface portion of the substrate aperture is disturbed or removed, one or more substrate securing tangs 506 remain engaged with the substrate aperture sidewalls to secure securing clip 500 to the substrate.

When a fragment module (e.g., fragment module 220 of FIG. 2) is disposed within the cavity, one or more sidewalls 512 at least partially surround a portion of the fragment module. Moreover, one or more fragment securing tangs 504 extend into the cavity and a portion of fragment securing tang 504 contacts and engages with the fragment module.

Figure 6:
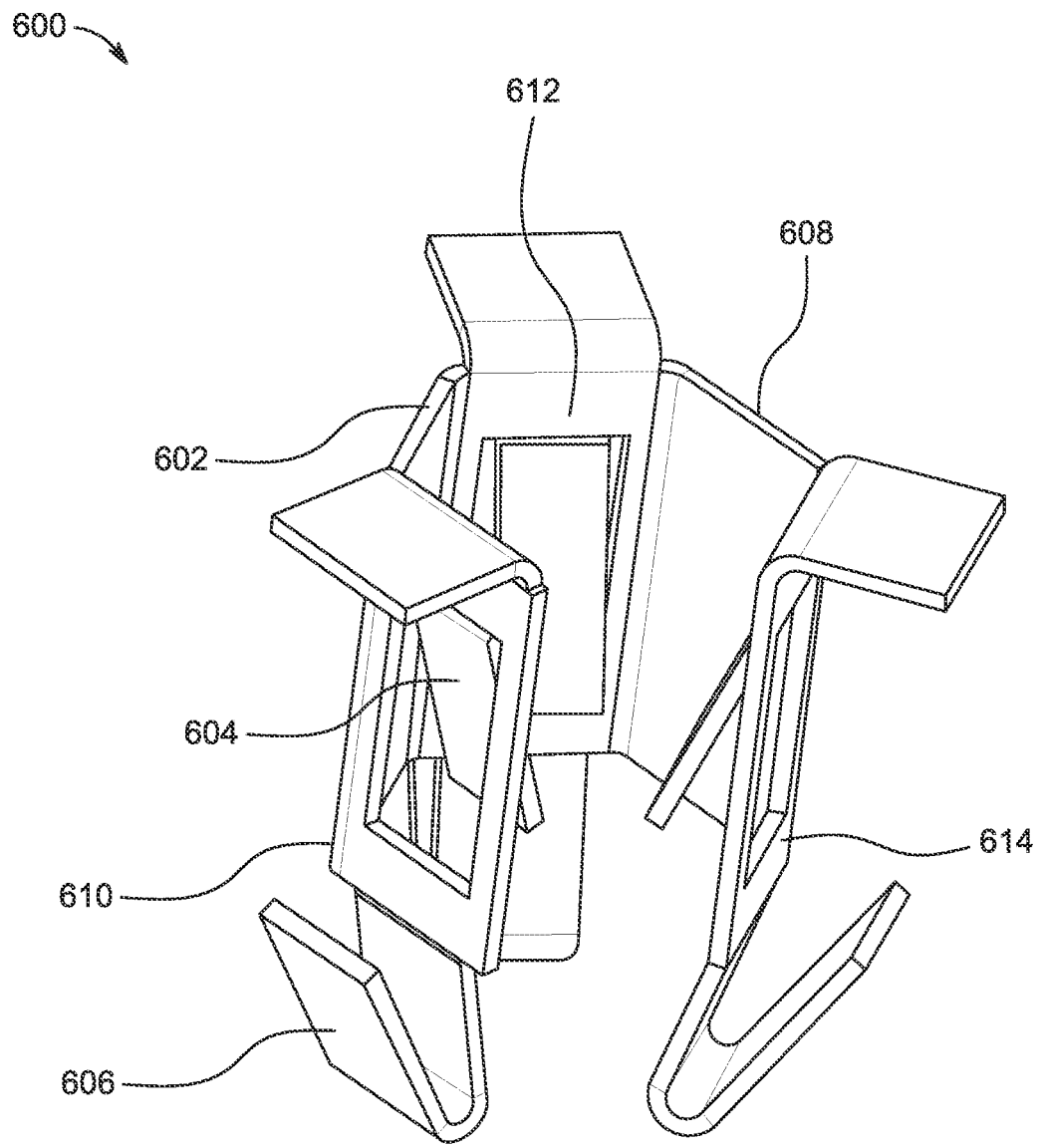
FIG. 6 shows a perspective view of a securing clip, according to yet another embodiment of the present arrangements, and that includes one or more substrate securing tangs that extend from one end of the body of the securing clip.

FIG. 6 shows a securing clip 600, according to another embodiment of the present arrangements, that includes one or more substrate securing tangs 606 that extends from an enclosure body 602 and one or more fragment securing tangs 604. Enclosure body 102 includes a first end 608, a second end 610, and one or more sidewalls 612 that extend between first end 608 and second end 610. One or more fragment securing tangs 604 extend, from one or more sidewalls 612, into the cavity.

One or more substrate securing tangs 606 extend from second end 610. At least a portion of one or more substrate tangs 106 extend beyond an exterior surface 614 of one or more sidewalls 612. As discussed above, when securing clip 600 is installed within a substrate aperture (e.g., substrate aperture 224 of FIG. 2), one or more substrate securing tangs 106 contacts an internal sidewall of the substrate aperture to prevent and/or impede vertical movement or removal of securing clip 100 from substrate (e.g., substrate 222 of FIG. 2). Moreover, by positioning one or more substrate securing tangs 606 towards a bottom portion of securing clip 600, one or more substrate securing tangs 606 engages with substrate aperture sidewalls before a remaining portion of enclosure body 602 enters a substrate aperture.

Figure 7:
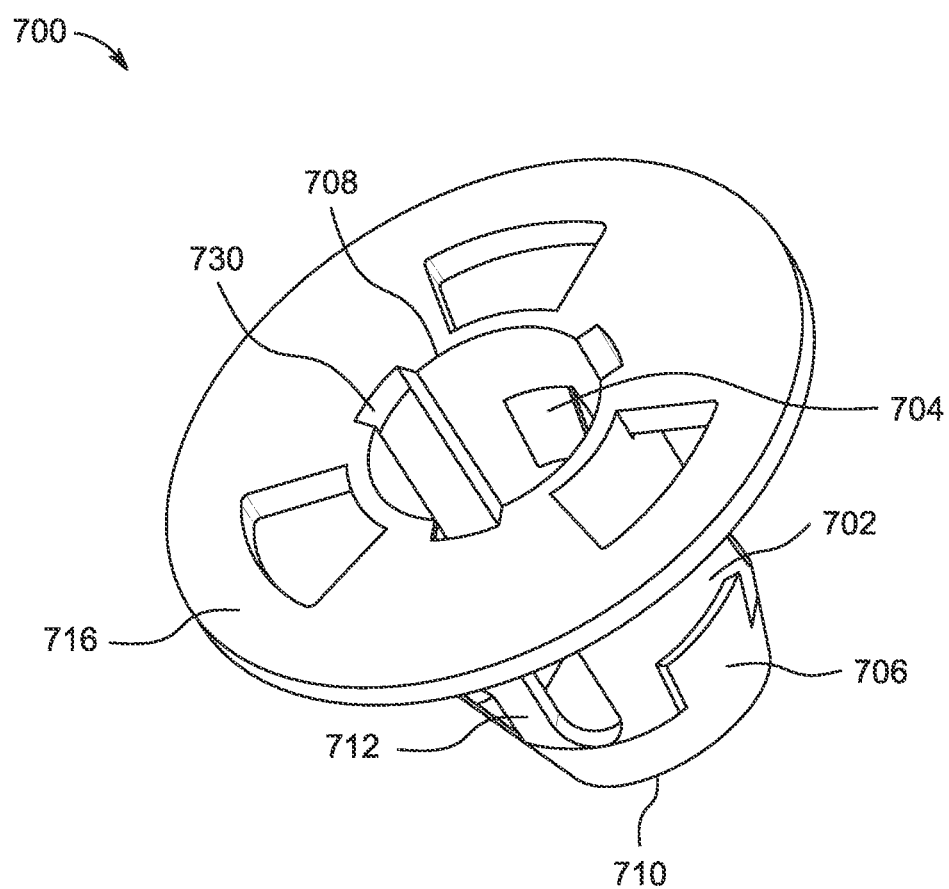
FIG. 7 shows a perspective view of a securing clip, according to yet another embodiment of the present arrangements, that includes one or more channels that allow the securing clip to flex or deform when a fragment module is placed into a cavity defined by the enclosure body.

FIG. 7 shows a securing clip 700, according to yet another embodiment of the present arrangements, that include an enclosure body 702, one or more fragment securing tangs 704, and one or more substrate securing tangs 706. One or more fragment securing tangs 404 extend into a cavity defined by a circular sidewall 712. Circular sidewall 712 includes one or more channels 730 that extend from a first end 708 towards second end 710. One or more channels 730, allow securing clip 700 to flex or deform when a fragment module is placed into a cavity defined by enclosure body 702 and/or when securing clip is placed into a substrate aperture.

Securing clip further includes a tab 716 that extends from first end 708 and way from circular sidewall 712. Preferably, tab 716 is perpendicular to circular sidewall 112.

Figure 8:
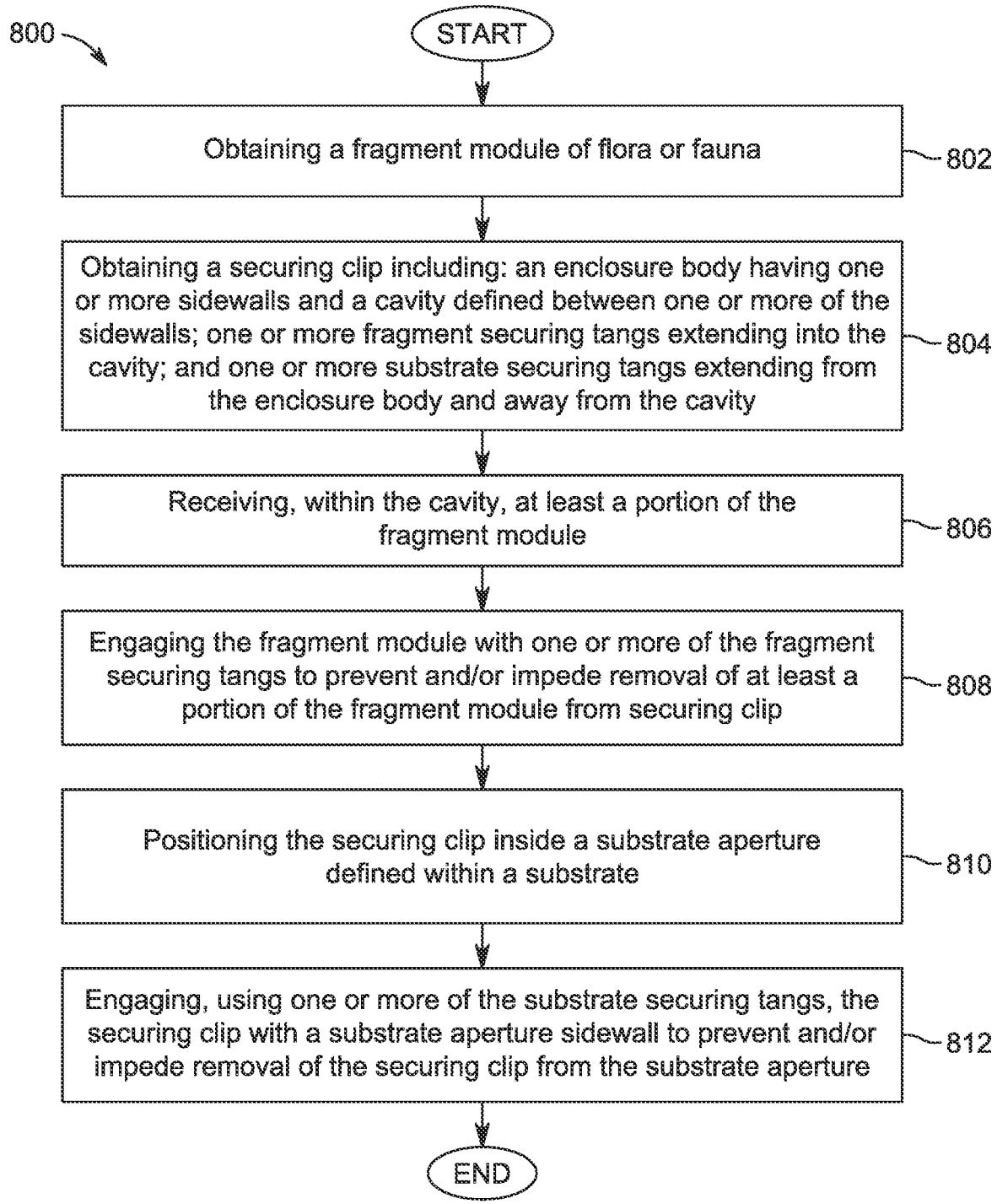
FIG. 8 shows a process flow diagram of a method, according to one embodiment of the present arrangements, of securing a fragment module to a substrate.

The present teachings offer, among other things, different methods of securing a fragment module to a substrate. FIG. 8 shows a method for securing a fragment module to a substrate, according to one embodiment of the present teachings. Method 800 begins with a step 802, which includes obtaining a fragment module. As discussed above, the fragment module may be a piece of living flora and/or fauna (e.g., coral) or a structure onto which flora and/or fauna is grown).

A step 804 includes obtaining a securing clip (e.g., securing clip 100 of FIG. 1. The securing clip, in one embodiment of the present teachings, includes an enclosure body (e.g., enclosure body 102 of FIG. 1) having: one or more sidewalls (e.g., one or more sidewalls 112 of FIG. 1) and a cavity defined between none or more of the sidewalls; one or more fragment securing tangs (e.g., one or more fragment securing tangs 104 of FIG. 1); and one or more substrate securing tangs (e.g., one or more substrate securing tangs 106 of FIG. 1).

Next, a step 806 includes receiving, within the cavity defined by one or more of the sidewalls, at least a portion of the fragment module. In one implementation of the present teachings, the cavity receives a shaft portion (e.g., stem portion 328 of FIG. 3) of the substrate module.

Following step 806, a step 808 is implemented and includes engaging the fragment module with one or more of the fragment tangs to prevent and/or impede removal of at least a portion of the fragment module from securing clip.

Next, a step 810 includes positioning the securing clip into a substrate aperture (e.g., substrate aperture 324 of FIG. 3) defined within a substrate (e.g., substrate 322 of FIG. 3).

A step 812, includes engaging, using one or more of the substrate securing tangs, the securing clip with a substrate aperture sidewall (e.g., substrate aperture sidewall 323 of FIG. 3) to prevent and/or impede removal of the securing clip from the substrate aperture.

In one embodiment of the present teachings, step 896 includes closing a sidewall gap or sidewall opening between one or more of the sidewalls of the enclosure body until one or more sidewalls at least partially surround the fragment module.

In another embodiment of the present teachings, step 808 includes deflecting one or more of the fragment securing tangs towards one or more of the sidewalls when at least a portion of the fragment module is placed within and cavity and generating a spring force away from one or more of the sidewalls to prevent and/or impede removal of at least a portion of the fragment module from the cavity.

In yet another embodiment of the present teachings, step 812 includes deflecting one or more of the substrate securing tangs towards the enclosure body when at least a portion of the securing clip is placed into the substrate aperture and generating a spring force away from the enclosure body to prevent and/or impede removal of the securing clip from the substrate aperture.

Although illustrative embodiments of this invention have been shown and described, other modifications, changes, and substitutions are intended. Accordingly, it is appropriate that the disclosure be construed broadly.

What is claimed is:

1. A securing clip comprising:
   an enclosure body including a first end, a second end, and one or more sidewalls that extend between said first end and said second end and that is designed to at least partially surround at least a portion of a fragment module when said fragment module is disposed within a cavity defined between one or more of said sidewalls;
   one or more fragment module securing tangs extending from one or more of said sidewalls into said cavity such that when at least a portion of said fragment module is placed within said cavity, at least a portion of said fragment module securing tang is designed to engage with said fragment module and prevent and/or impede removal of at least a portion of said fragment module from said cavity;
   one or more substrate securing tangs extending from said enclosure body and away from said cavity and each of said substrate securing tangs being designed to prevent and/or impede removal of said enclosure body positioned inside a substrate aperture defined within a substrate; and
   wherein one or more of said sidewalls is pliable such that a force applied to one or more of said sidewalls bends one or more of said sidewalls, from an open position to a closed position, to form said cavity and one or more of said fragment module securing tangs is designed to engage said fragment module.

2. The securing clip of claim 1, wherein at least one edge or surface of one or more of said fragment module securing tangs engages with said fragment module to prevent and/or impede removal of at least a portion of said fragment module from said cavity.

3. The securing clip of claim 1, wherein said enclosure body includes six sidewalls and said cavity defined by said sidewalls is hexagonal.

4. The securing clip of claim 1, wherein said enclosure body includes a circular sidewall.

5. The securing clip of claim 1, wherein said cavity extends through said first end and said second end such that, when said fragment module is placed into said cavity, at least a portion of said fragment module extends beyond said first end and/or said second end.

6. The securing clip of claim 1, wherein said securing clip is produced from a single piece of material.

7. The securing clip of claim 1, wherein said securing clip is made from a material that corrodes when said material is exposed to saltwater and is selected from at least one material selected from a group comprising biodegradable plastic, steel, aluminium, plants, plastic, and fungi.

8. The securing clip of claim 1, further comprising one or more tabs extending from said first end and away from said cavity, each of said tabs including a raised portion that is elevated from a portion of each of said tabs.

9. The securing clip of claim 8, wherein one or more of said tabs extends perpendicular to one or more of said sidewalls.

10. The securing clip of claim 1, wherein one or more of said substrate securing tangs extends from a base portion of said enclosure body.

11. The securing clip of claim 1, wherein one or more of said substrate securing tangs extends from one or more of said sidewalls.

12. A method for securing a fragment module to a substrate, said method comprising:
   obtaining a fragment module of flora or fauna;
   obtaining a securing clip comprising:
     an enclosure body including one or more sidewalls and a cavity defined between one or more of said sidewalls;
     one or more fragment securing tangs extending into said cavity;
     one or more substrate securing tangs extending from said enclosure body and away from said cavity;
   receiving, within said cavity, at least a portion of said fragment module;
   engaging said fragment module with one or more of said fragment securing tangs to prevent and/or impede removal of at least a portion of said fragment module from securing clip;
   positioning said securing clip into a substrate aperture defined within said substrate; and
   engaging, using one or more of said substrate securing tangs, said securing clip with a substrate aperture sidewall to prevent and/or impede removal of said securing clip from said substrate aperture.

13. The method for securing said fragment module to said substrate of claim 12, wherein engaging said fragment module further includes deflecting one or more of said fragment securing tangs towards one or more of said sidewalls when at least a portion of said fragment module is placed within said cavity and generating a spring force away from one or more of said sidewalls to prevent and/or impede removal of at least a portion of said fragment module from said cavity.

14. The method for securing said fragment module to said substrate of claim 12, wherein engaging said securing clip further includes deflecting one or more of said substrate securing tangs towards said enclosure body when at least a portion of said securing clip is placed into said substrate aperture and generating a spring force away from said enclosure body to prevent and/or impede removal of said securing clip.

15. A securing clip comprising:
   an enclosure body including a first end, a second end, and one or more sidewalls that extend between said first end and said second end and that is designed to at least partially surround at least a portion of a fragment module when said fragment module is disposed within a cavity defined between one or more of said sidewalls;
   one or more fragment module securing tangs extending from one or more of said sidewalls into said cavity such that when at least a portion of said fragment module is placed within said cavity, at least a portion of said fragment module securing tang is designed to engage with said fragment module and prevent and/or impede removal of at least a portion of said fragment module from said cavity;
   one or more substrate securing tangs extending from said enclosure body and away from said cavity and each of said substrate securing tangs being designed to prevent and/or impede removal of said enclosure body positioned inside a substrate aperture defined within a substrate; and
   one or more tabs extending from said first end and away from said cavity, each of said tabs including a raised portion extending away from said cavity and that is elevated from a portion of each of said tabs.

16. The securing clip of claim 15, wherein said raised portion is substantially parallel with a portion of each of said tabs.

* * * * *